(12) United States Patent
Zhang et al.

(10) Patent No.: US 9,568,777 B2
(45) Date of Patent: Feb. 14, 2017

(54) DISPLAY SUBSTRATE, PREPARING METHOD THEREOF, AND DISPLAY DEVICE

(71) Applicants: BOE Technology Group Co., Ltd., Beijing (CN); BEIJING BOE OPTOELECTRONICS TECHNOLOGY CO., LTD., Beijing (CN)

(72) Inventors: Ying Zhang, Beijing (CN); Jingpeng Li, Beijing (CN); Lei Tang, Beijing (CN); Yang Pei, Beijing (CN); Xin Li, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 14/426,282

(22) PCT Filed: Jun. 5, 2014

(86) PCT No.: PCT/CN2014/079292
§ 371 (c)(1),
(2) Date: Mar. 5, 2015

(87) PCT Pub. No.: WO2015/106527
PCT Pub. Date: Jul. 23, 2015

(65) Prior Publication Data
US 2016/0041416 A1    Feb. 11, 2016

(30) Foreign Application Priority Data

Jan. 15, 2014    (CN) .......................... 2014 1 0019339

(51) Int. Cl.
*G02F 1/13* (2006.01)
*G02F 1/1339* (2006.01)
(Continued)

(52) U.S. Cl.
CPC ............ *G02F 1/13394* (2013.01); *G02B 7/006* (2013.01); *G02F 1/1333* (2013.01); *G02F 1/1368* (2013.01);
(Continued)

(58) Field of Classification Search
CPC ...... H01L 27/32; H01L 27/3253; H01L 51/52; H01L 51/525; H01L 51/5228
(Continued)

(56) References Cited

U.S. PATENT DOCUMENTS

2003/0213956 A1    11/2003    Hioki et al.
2006/0066600 A1    3/2006    Palmateer
(Continued)

FOREIGN PATENT DOCUMENTS

CN    1755486 A    4/2006
CN    1790070 A    6/2006
(Continued)

OTHER PUBLICATIONS

International Search Report and Written Opinion mailed Oct. 22, 2014 (PCT/CN2014/079292); ISA/CN.
(Continued)

*Primary Examiner* — Michael Lebentritt
(74) *Attorney, Agent, or Firm* — Banner & Witcoff, Ltd.

(57) ABSTRACT

A display substrate, a preparing method thereof, and a display device are disclosed; the display substrate comprises a display region, a non-display region, and a transparent support enhancement layer, the support enhancement layer is disposed at least in a region corresponding to the display region. The display substrate is not easy to be damaged by pressure, and can efficiently avoid a phenomenon of display defects of a display device.

14 Claims, 6 Drawing Sheets

(51) Int. Cl.
*G02F 1/1333* (2006.01)
*G02B 7/00* (2006.01)
*G02F 1/1335* (2006.01)
*G02F 1/1368* (2006.01)

(52) U.S. Cl.
CPC ... *G02F 1/133308* (2013.01); *G02F 1/133514* (2013.01); *G02F 1/133516* (2013.01); *G02F 2001/133302* (2013.01); *G02F 2001/133317* (2013.01); *G02F 2001/133325* (2013.01); *G02F 2001/133519* (2013.01); *G02F 2201/50* (2013.01); *G02F 2201/54* (2013.01)

(58) Field of Classification Search
USPC .......................................................... 257/88
See application file for complete search history.

(56) References Cited

U.S. PATENT DOCUMENTS

| | | | | |
|---|---|---|---|---|
| 2009/0059155 | A1* | 3/2009 | Nakayama | G02F 1/13394 349/156 |
| 2010/0283056 | A1* | 11/2010 | Yasumatsu | G02F 1/133305 257/59 |
| 2011/0216264 | A1* | 9/2011 | So | G02F 1/1335 349/61 |
| 2015/0049269 | A1* | 2/2015 | Okazaki | G02F 1/1337 349/33 |
| 2015/0070336 | A1* | 3/2015 | Qu | G09G 3/3648 345/206 |
| 2015/0108512 | A1* | 4/2015 | Shimayama | H01L 27/3253 257/88 |

FOREIGN PATENT DOCUMENTS

| | | |
|---|---|---|
| CN | 102736294 A | 10/2012 |
| CN | 203133440 U | 8/2013 |
| CN | 103760719 A | 4/2014 |

OTHER PUBLICATIONS

Oct. 27, 2015—(CN)—First Office Action Appn 201410019339.6 with English Tran.
Apr. 13, 2016—(CN)—Second Office Action Appn 201410019339.6 with English Tran.
Aug. 24, 2016—(CN)—Third Office Action Appn 201410019339.6 with English Tran.

\* cited by examiner

DISPLAY SUBSTRATE, PREPARING METHOD THEREOF, AND DISPLAY DEVICE

The application is a U.S. National Phase Entry of International Application No. PCT/CN2014/079292 filed on Jun. 5, 2014, designating the United States of America and claiming priority to Chinese Patent Application No. 201410019339.6 filed on Jan. 15, 2014. The present application claims priority to and the benefit of the above-identified applications and the above-identified applications are incorporated by reference herein in their entirety.

TECHNICAL FIELD

Embodiments of the present invention relate to a display substrate and a display device.

BACKGROUND

Thin film transistor liquid crystal displays (TFT-LCDs) belong to a main kind of flat panel displays (FPDs). A typical TFT-LCD comprises a color filter substrate, an array substrate, and a liquid crystal layer interposed between the two substrates; a post spacer (PS) is disposed between the color filter substrate and the array substrate, so as to maintain a cell gap.

As illustrated by FIGS. 1~3, a color filter substrate comprises: a first base substrate 1, a color filter layer and a black matrix 3 that are disposed on the first base substrate 1, and a first transparent electrode layer 4 disposed on the color filter layer and the black matrix 3. Generally, the color filter layer comprises a plurality of sub-pixel color films 2 (for example, red sub-pixel color films, green sub-pixel color films, and blue sub-pixel color films); the array substrate comprises: a second base substrate 7 and a thin film transistor 8 disposed on the second base substrate 7.

SUMMARY

Embodiments of the present invention provide a display substrate of pressure resistance and a display device.

At least one embodiment of the present invention provides a display substrate, which comprises a display region and a non-display region; at least a region corresponding to the display region is provided with a transparent support enhancement layer.

At least another embodiment of the present invention provides a preparing method of a display substrate, the display substrate comprises a display region and a non-display region, and the preparing method comprises: forming a transparent support enhancement layer at least in the display region of the display substrate.

At least yet another embodiment of the present invention provides a display device, which comprises the abovementioned display substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DRAWING REFERENCE NUMBERS

1—first base substrate; 2—sub-pixel color film; 3—black matrix; 4—first transparent electrode layer; 5—post spacer; 6—support enhancement layer; 7—second base substrate; 8—thin film transistor; 20—array substrate; 30—color filter substrate; 35—sealant; 40—liquid crystal material; 50—backlight source.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Figure 1:
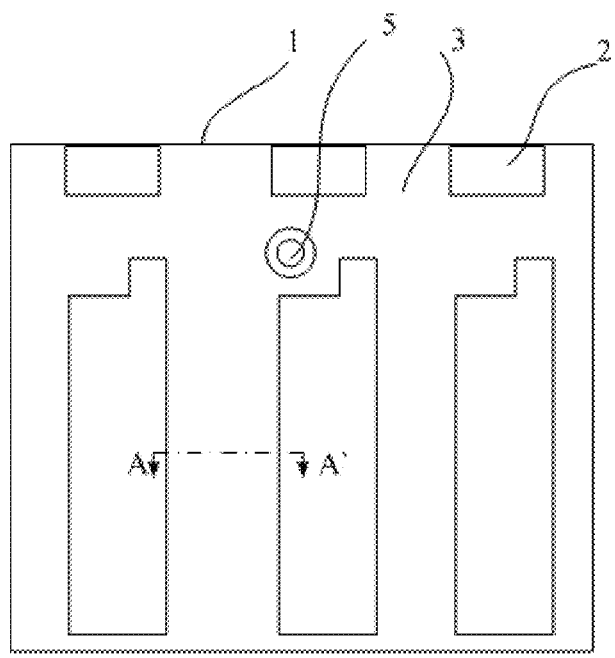
FIG. 1 is a schematic plan view of a color filter substrate.
Figure 2:
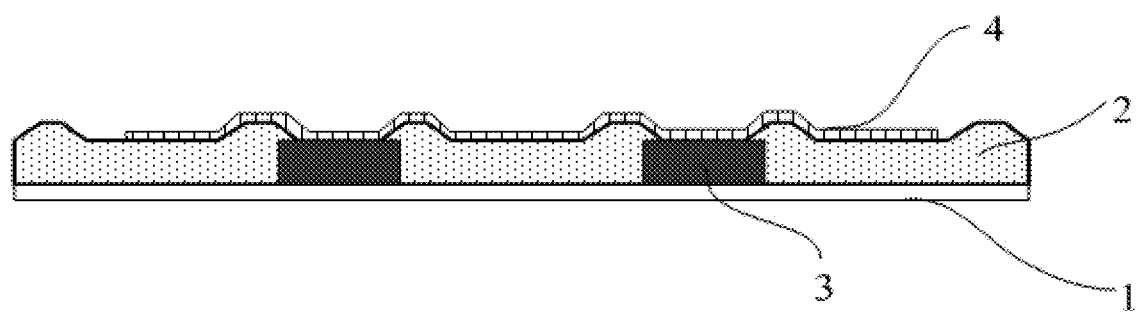
FIG. 2 is a cross-sectional schematic diagram taken along a direction of A-A' of FIG. 1.
Figure 3:
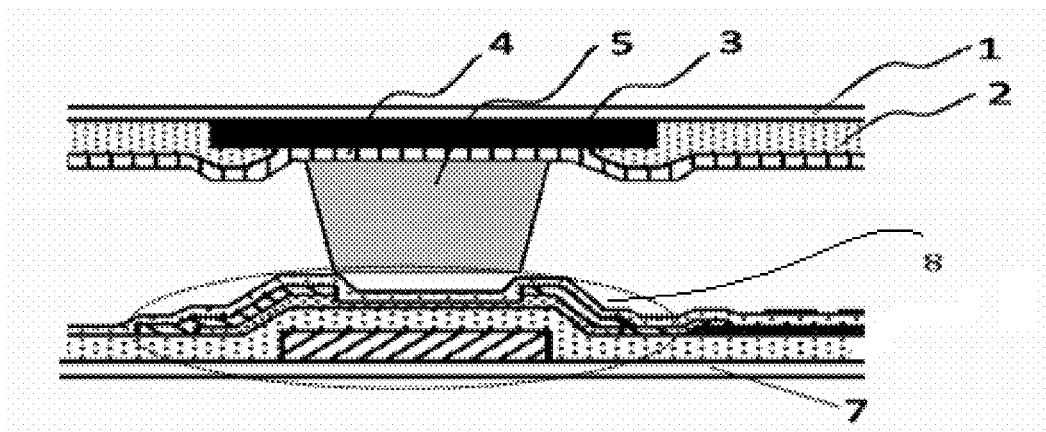
FIG. 3 is a cross-sectional schematic diagram of a part of the structure of a display panel.
Figure 4:
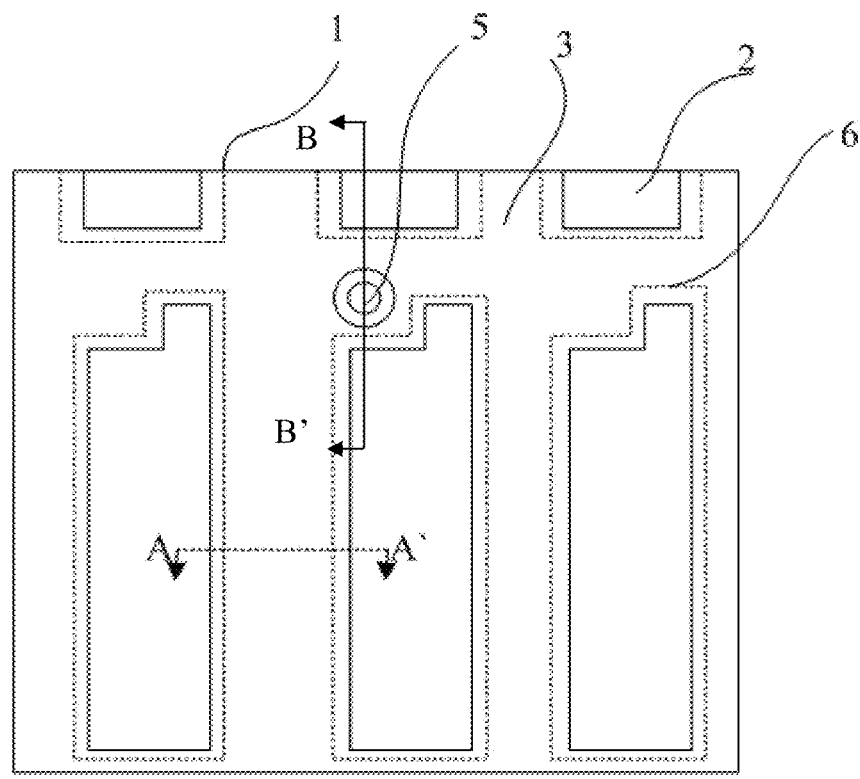
FIG. 4 is a schematic plan view of a color filter substrate according to a first embodiment of the present invention.
Figure 5:
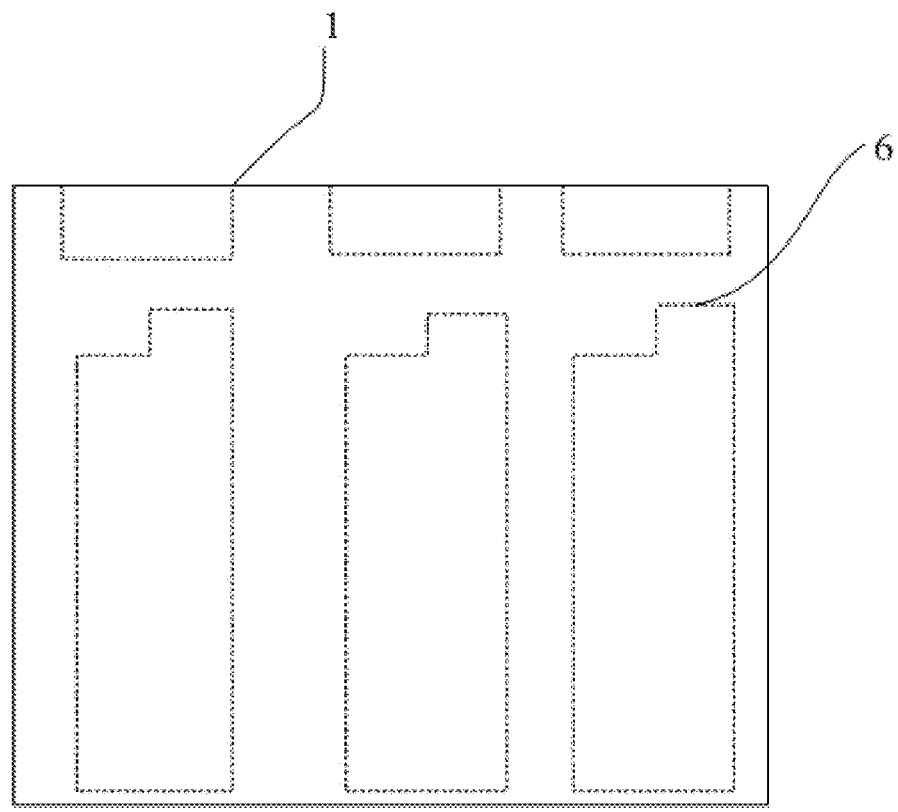
FIG. 5 is a schematic plan view of a support enhancement layer in FIG. 4.
Figure 6:
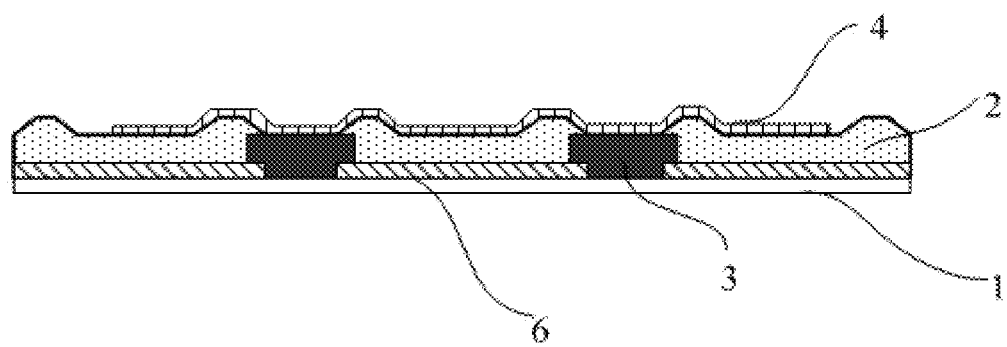
FIG. 6 is a cross-sectional schematic diagram taken along a direction of A-A' of FIG. 4.

The inventors of the present application have noted that: with regard to a flat panel display, for example, in the case illustrated by FIGS. 1-3, materials of a sub-pixel color film 2 and a black matrix 3 may be formed of a resin with weak pressure resistance, and in this case, when a color filter substrate is pressed by an exterior force, it is easy to result in a phenomenon of image quality defects such as white wash in the pressed region in displaying. If the pressing force is too big, even a post spacer 5 inside the display device is harmed, and it also generates a phenomenon of image quality defects such as white wash or blue wash. Further, when an array substrate is pressed, the array substrate will be deformed, which will result in a phenomenon of display defects.

First Embodiment

The present embodiment provides a display substrate, which comprises a display region and a non-display region; in an example, at least the display region is provided with a support enhancement layer and the support enhancement layer is of a transparent structure. For example, the display region usually refers to a region configured for displaying images, and the non-display region refers to a peripheral region for the display region, such as surrounding the display region.

At least the display region of the display substrate of the present embodiment is provided with a support enhancement layer which can efficiently bear exterior forces, thereby avoiding a phenomenon of various image defects when the display substrate is pressed, and which can reduce the damage to the display substrate caused by the exterior forces.

It should be noted that the display substrate of the present embodiment may comprise a color filter substrate or an array substrate or a combination thereof, but which is not limited thereto. For example, beside an array structure comprising such as thin film transistors, signal lines and so on, the array substrate may further comprise a color filter structure, and the color filter structure may be disposed on or under the array structure. Further, the display substrate may be a substrate applicable to a flat panel display such as: a liquid crystal display, a plasma display, an electroluminescence display and the like. Hereinafter, a color filter substrate and an array substrate are described as examples of the display substrate to illustrate the display substrate of the present embodiment, respectively.

In an example of the present embodiment illustrated by FIGS. 4~7, the display substrate is a color filter substrate. In the example, the color filter substrate may comprise a first base substrate 1 and a color filter layer disposed on the first base substrate 1. The color filter layer may comprise a plurality of sub-pixel color films 2. The plurality of sub-pixel color films 2 may be disposed at intervals, and a black matrix 3 may be disposed between adjacent sub-pixel color films 2.

In an example, a color filter substrate may comprise a color filter layer comprising a red sub-pixel color film, a green sub-pixel color film, and a blue sub-pixel color film. Embodiments of the present are not limited to the specific colors of the sub-pixel color films. A black matrix 3 may be further disposed on the color filter substrate, and the black matrix 3 is disposed between two adjacent sub-pixel color films 2, so as to define the sub-pixels. A support enhancement layer 6 is disposed at least between the first base substrate 1 and the sub-pixel color films 2; that is to say, a support enhancement layer 6 is disposed at least between positions where the red sub-pixel color film, the green sub-pixel color film or the blue sub-pixel color film is located and the first base substrate 1. Because a material of the sub-pixel color films 2 may be a resin material, in this case, the pressure resistance of the sub-pixel color films 2 is weak, and a support enhancement layer 6 is disposed, which can efficiently bear the pressure of the exterior forces applied to the sub-pixel color films 2 and avoid the damage to the sub-pixel color films 2. If a color filter substrate in this kind of structure is applied to a display device, in particular to a touch display device, it can efficiently avoid the phenomenon of display defects of the display device caused by the pressure of relatively large exterior forces.

It should be noted that, because the support enhancement layer 6 is of a transparent structure, it may be of a structure in an entire layer; for example, the support enhancement layer 6 in the whole display region is integral. Certainly, the support enhancement layer 6 may comprise a plurality of block structures arranged at intervals, each block structure is correspondingly disposed in a region on the display substrate where each sub-pixel color film is located. For example, each block in the support enhancement layer 6 having block structures arranged in a matrix corresponds to a position where the sub-pixel color film 2 is located. In an example, the area of each block may be equal to or slightly bigger than that of each sub-pixel color film. Herein, "slightly bigger" means that the block is located not only on the position where the sub-pixel color film 2 is located, but also at least on the position corresponding to the black matrix. When the support enhancement layer 6 adopts the block structures arranged at an interval, it can better bear the action of the exterior forces. These blocks may be insulated from each other or electrically connected with each other.

Figure 7:
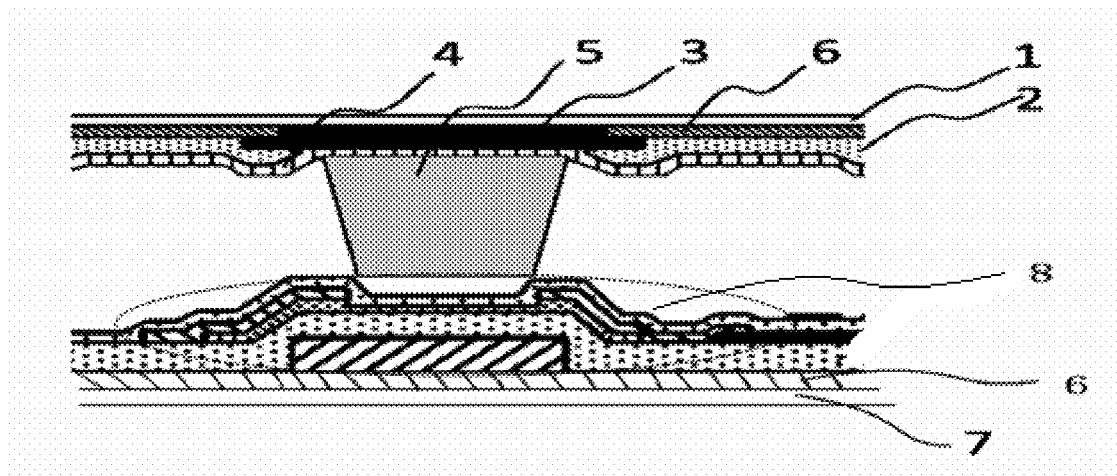
FIG. 7 is a cross-sectional schematic diagram of a part of the structure of a display panel provided by an embodiment of the present invention.
Figure 8:
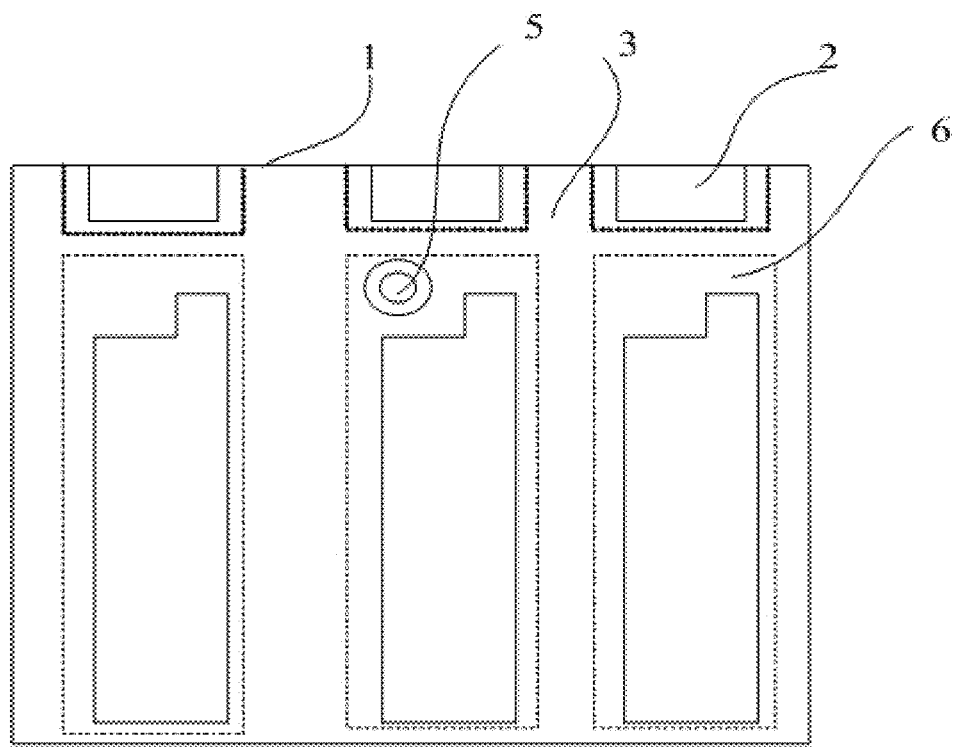
FIG. 8 is a schematic plan view of a color filter substrate in which a support enhancement layer is disposed at a position where a post spacer located according to the first embodiment of the present invention.
Figure 9:
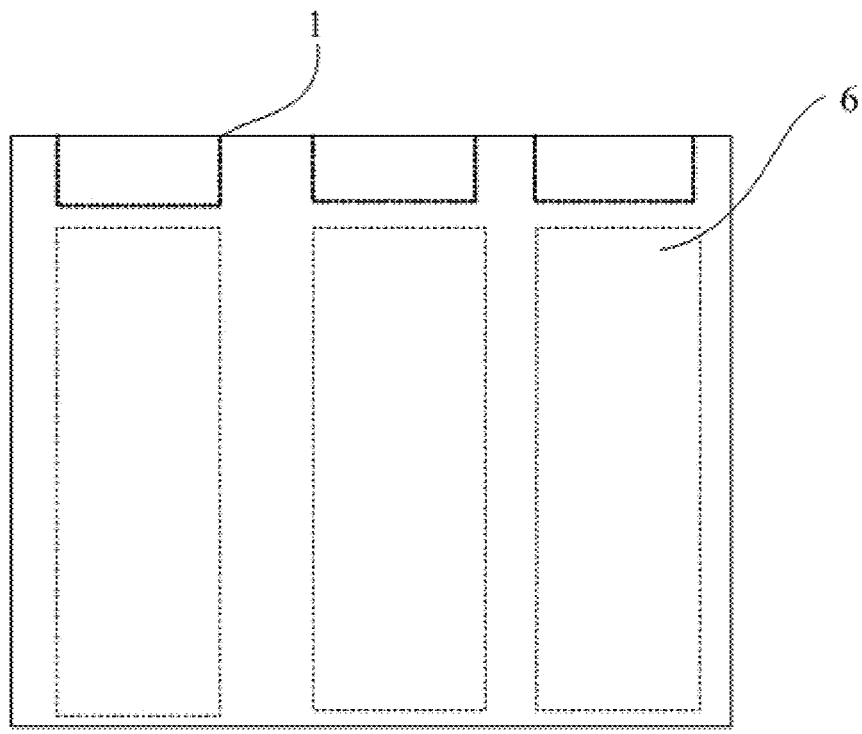
FIG. 9 is a schematic plan view of the support enhancement layer in FIG. 8.

As illustrated by FIGS. 7, 8, and 9, the above-mentioned color filter substrate may further comprise: a first transparent electrode layer 4 disposed on the color filter layer and post spacers 5 disposed at intervals on the first transparent electrode layer 4. The first transparent electrode layer 4 is, for example, a common electrode or a pixel electrode on the color filter substrate. The post spacers 5 are also vulnerable to be damaged during a pressing process because the exterior force is relatively big, thus the support enhancement layer 6 may be further disposed in regions corresponding to the post spacers on the color filter substrate. In an example, the support enhancement layer 6 may enclose the post spacers 5, so that the pressure resistance of the post spacers 5 is further improved.

In order not to affect the light transmission rate, in the present embodiment, the thickness of the sub-pixel color film 2 may be correspondingly made thinner, so as to control a sum of the thickness of the sub-pixel color film 2 and the support enhancement layer 6 around a typical thickness (2.5~5 μm) of the sub-pixel color film 2. For example, a sum of the thickness of the support enhancement layer 6 and the thickness of the sub-pixel color film may be between 2.5~5 μm. For another example, the thickness of the support enhancement layer may be between 1~3 μm. Certainly, it can be set according to the specific requirements.

Figure 10:
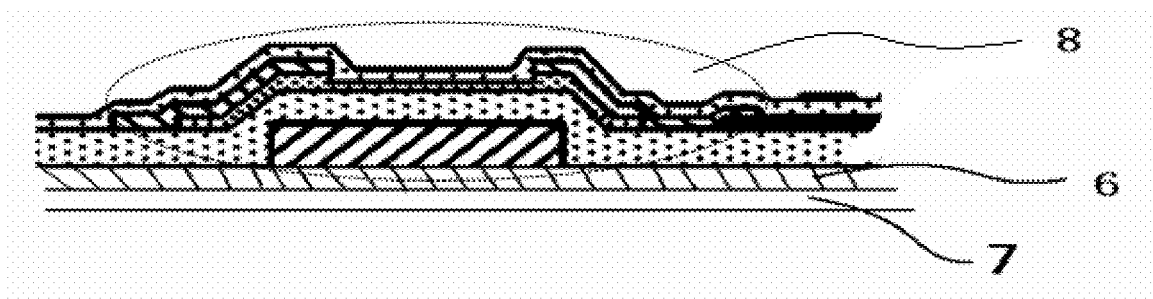
FIG. 10 is a cross-sectional schematic diagram of a part of an array substrate according to the first embodiment of the present invention.

In an example of the present embodiment as illustrated by FIG. 10, the display substrate is an array substrate. In the example, the array substrate comprises a second base substrate 7 and a thin film transistor 8 disposed on the second base substrate 7. In an example, the support enhancement layer is disposed on the second base substrate 7 and located under the thin film transistor 8, for example, under the lowest film layer of the transistor 8. Certainly, in this example, this support enhancement layer 6 may be disposed not only in a region corresponding to the display region, but also in, for instance, a non-display region under the thin film transistor 8.

In an example, for convenient preparation, when the thin film transistor 8 is a bottom gate type thin film transistor, a support enhancement layer 6 may be disposed between the second base substrate 7 and a layer where a gate electrode is located, i.e., under the layer where the gate electrode is located; when the thin film transistor 8 is a top gate type thin film transistor, the support enhancement layer 6 may be disposed between the second base substrate 7 and a layer where an active layer is located, i.e., under the layer where the active layer located.

A support enhancement layer 6 is disposed between the second base substrate 7 and the thin film transistor 8, thus the ability of bending resistance of an array substrate may be enhanced.

It should be noted that, in the embodiment, the support enhancement layer 6 may also be of a structure in an entire layer. Certainly, the support enhancement layer 6 may adopt block structures arranged at intervals, i.e., each block of the support enhancement layer 6 corresponds to a projection region of a sub-pixel color film 2 on the array substrate. Furthermore, the area of each block may be equal to or slightly bigger than that of a display region. These blocks may be insulated from each other or electrically connected with each other.

For example, a material of the support enhancement layer in the present embodiment may be polycarbonate. Certainly, the material of the support enhancement layer is not limited to this material, and the other transparent materials having an effect of the supporting enhancement layer 6 may be acceptable.

It should be noted that the display substrate of the present embodiment may be applied to a display panel, and for example, the display panel comprising a color filter substrate and an array substrate, as illustrated by FIGS. 4~10. It can be seen from the example illustrated by FIG. 7 (a cross-sectional schematic diagram taken along a direction of B-B' of FIG. 4) that both the array substrate and the color filter substrate of the display panel are provided with support enhancement layers respectively, thus the ability of resisting pressure of the display is obviously enhanced.

Second Embodiment

The present embodiment provides a preparing method of a display substrate, the display substrate comprises a display region and a non-display region; the preparing method comprises: forming a transparent support enhancement layer at least in the display region.

It should be noted that the display substrate of the present embodiment may comprise a color filter substrate or an array substrate or a combination thereof, but which is not limited thereto. For example, beside an array structure comprising such as thin film transistors, signal lines and so on, the array substrate may further comprise a color filter structure, and the color filter structure may be disposed on or under the array structures. Further, the display substrate may be a substrate applied to a flat panel display such as a liquid crystal display, a plasma display, an electroluminescence display and the like.

Hereafter, a color filter substrate and an array substrate are separately described as examples of the display substrate to illustrate the preparing methods of the display substrates of the present embodiment.

In an example, the display substrate is a color filter substrate, the color filter substrate comprises a first base substrate and a color filter layer disposed on the first base substrate; the color filter layer comprises a plurality of sub-pixel color films, and the plurality of sub-pixel color films are disposed at intervals. It should be noted that a black matrix may be disposed between two adjacent sub-pixel color films so as to define sub-pixels. Certainly, the black matrix may also be disposed on an array substrate, the present embodiment takes the black matrix disposed between two adjacent sub-pixel color films as an example, but the embodiment of the present invention is not limited thereto.

The step of forming a transparent support enhancement layer at least in the display region of the display substrate may comprise: forming a transparent support enhancement layer in a display region of the first base substrate of the display substrate.

In an example, after the above step, the preparing method of the display substrate of the present embodiment may further comprise: forming a sub-pixel color film on the first substrate with a support enhancement layer being formed on. In an example, a support enhancement layer may be disposed at least between the first base substrate and the sub-pixel color film.

In an example, after the above step, the preparing method of the present embodiment may further comprise: forming a pattern comprising post spacers on the first base substrate.

In the present embodiment, the support enhancement layer may be further formed in regions corresponding to the post spacers on the color filter substrate. This support enhancement layer may enclose the post spacers, so as to further improve the ability of pressure resistance of the post spacers.

Certainly, the support enhancement layer may be of a structure in an entire layer, may also comprise a plurality of block structures arranged at an interval. In an example, the area of the block may also be not smaller than that of the sub-pixel color film, and these blocks may be insulated from each other or electrically connected with each other.

It should be noted that the display substrate may be the color filter substrate in the first embodiment, thus its ability of resisting pressure is obviously improved, and descriptions thereto are omitted.

Certainly, the display substrate may also be an array substrate, and the array substrate comprises a second base substrate and a thin film transistor on the second base substrate.

In an example, the step of forming a transparent support enhancement layer at least in the display region of the display substrate may comprise: forming a transparent support enhancement layer at least in a display region of the second base substrate of the display substrate.

In an example, the preparing method may further comprise: forming, for example, a thin film transistor on the second base substrate with a support enhancement layer being formed on. In an example, the support enhancement layer may be disposed on the second base substrate and under the thin film transistor, for example, under the lowest film layer of the thin film transistor. That is to say, the support enhancement layer may be disposed not only in a region corresponding to a display region of the second base substrate, but also in a non-display region under the thin film transistor.

It should be noted that because the preparation of a thin film transistor is a preparing method which is well known by those skilled in the art, descriptions thereto are omitted. Certainly, the array substrate may also be the array substrate in the first embodiment, thus its ability of resisting pressure is obviously improved.

The first base substrate and the second base substrate may be each of a normal glass base substrate, quartz base substrate, or the other base substrate, which is not limited thereto. Further, the positions where the support enhancement layers provided in the first embodiment and the second embodiment are located are only used to illustrate the implantation methods of the present invention, not limitation to the invention; those skilled in the art shall understand that the support enhancement layer may be further disposed in the other display regions or non-display regions.

Third Embodiment

The present embodiment provides a display device, which comprises the above-mentioned display substrate. The display device of the present embodiment may be a flat panel display such as: a liquid crystal display, a plasma display, an electroluminescence display or the like, which may comprise a front display substrate and a back display substrate.

Figure 11:
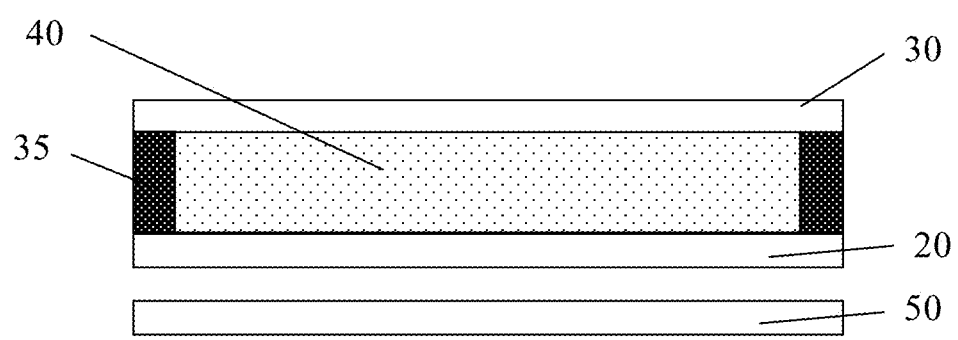
FIG. 11 is a structural schematic diagram of a display device according to a third embodiment of the present invention.

For example, a liquid crystal display is illustrated by FIG. 11, of which the front display substrate may be a color filter substrate 30, and the back display substrate may be an array substrate 20; the array substrate 20 and the color filter substrate are disposed opposite to each other and form a liquid crystal cell through sealant 35; and a liquid crystal material 40 is filled in the liquid crystal cell. A pixel electrode of each pixel unit of the array substrate 20 is used to apply an electric field to control a rotation degree of the liquid crystal material so as to conduct a display operation. In some embodiments, the display substrate further comprises a backlight source 50 for providing backlight to the array substrate 20.

The display device may be any product or component having a display function such as: an organic light emitting diode (OLED) panel, a cell phone, a flat panel computer, a television, a display, a notebook computer, a digital photo frame, a navigating instrument, and various kings of touch devices.

The display device of the present embodiment comprises the above-mentioned display substrate (such as a color filter substrate, an array substrate, or a combination thereof), thus its ability of resisting pressure is stronger, and the phenomenon of display defects caused by the pressure of exterior forces can be efficiently avoided. When the display device is a touch display device, its ability of resisting pressure is largely enhanced, thus the usage life of the display device can be extended.

Certainly, the display device of the present embodiment may further comprise other structures such as: a power unit, a display driving unit and the like, and descriptions thereto are omitted.

It is understandable that the above exemplary embodiments are only used to illustrate the principle of the present invention; however, the present invention is not limited thereto. Those skilled in the art can make various variations and improvements to the present invention without departing the spirit and scope, but such variations and improvements fall in the protection scope as defined by the present invention.

The present application claims a priority of a Chinese patent application with the application number of 201410019339.6, submitted on Jan. 15, 2014; the Chinese patent application is entirely incorporated herein by reference as a part of the present application.

The invention claimed is:

1. A display substrate, comprising a display region, a non-display region, and a transparent support enhancement layer, wherein the support enhancement layer is disposed at least in a region corresponding to the display region,
   wherein the display substrate further comprises:
   a first base substrate; and
   a color filter layer disposed on the first base substrate, comprising a plurality of sub-pixel color films;
   wherein the support enhancement layer is disposed at least between the first base substrate and at least one of the sub-pixel color films,
   wherein the support enhancement layer comprises a plurality of blocks arranged at an interval, the block is correspondingly disposed in a region where the sub-pixel color film is located.

2. The display substrate according to claim 1, wherein a sum of a thickness of the support enhancement layer and a thickness of the sub-pixel color film is from 2.5 to 5 μm.

3. The display substrate according to claim 1, wherein a thickness of the support enhancement layer is from 1 to 3 μm.

4. The display substrate according to claim 1, further comprising:
   a post spacer disposed on the display substrate;
   wherein the support enhancement layer is further disposed in a region corresponding to the post spacer on the display substrate.

5. The display substrate according to claim 1, wherein an area of the block is not smaller than that of the sub-pixel color film.

6. The display substrate according to claim 1, wherein a material of the support enhancement layer comprises polycarbonate.

7. A preparing method of a display substrate, wherein the display substrate comprises a display region and a non-display region, the preparing method comprises:
   forming a transparent support enhancement layer at least in the display region of the display substrate,
   wherein forming a transparent support enhancement layer in the display region of the display substrate comprises, forming a transparent support enhancement layer in a display region of a first base substrate of the display substrate,
   wherein the method further comprises, forming a sub-pixel color film on the first base substrate with the support enhancement layer being formed on, wherein the support enhancement layer is disposed at least between the first base substrate and the sub-pixel color film,
   wherein the support enhancement layer comprises a plurality of blocks arranged at an interval, the block is correspondingly disposed in a region where the sub-pixel color film is located.

8. The preparing method of a display substrate according to claim 7, further comprising:
   forming a post spacer on the display substrate;
   wherein a region corresponding to the post spacer on the display substrate is provided with the support enhancement layer.

9. The preparing method of a display substrate according to claim 7, wherein an area of the block is not smaller than that of the sub-pixel color film.

10. A display device, comprising the display substrate according to claim 1.

11. The display substrate according to claim 5, wherein the support enhancement layer encloses the post spacer.

12. The display substrate according to claim 1, wherein the display substrate further comprises a black matrix between the sub-pixel color films, and the blocks of the support enhancement layer is only overlapped with an edge portion of the black matrix.

13. The preparing method of a display substrate according to claim 8, wherein the support enhancement layer encloses the post spacer.

14. The preparing method of a display substrate according to claim 7, wherein the display substrate further comprises a black matrix between the sub-pixel color films, and the blocks of the support enhancement layer is only overlapped with an edge portion of the black matrix.

* * * * *